United States Patent [19]

Ohtsuka et al.

[11] Patent Number: 5,252,258

[45] Date of Patent: Oct. 12, 1993

[54] METHOD OF RECOVERING AND STORING RADIOACTIVE IODINE BY FREEZE VACUUM DRYING PROCESS

[75] Inventors: Katsuyuki Ohtsuka; Jin Ohuchi; Toru Suzuki, all of Ibaraki, Japan

[73] Assignee: Doryokuro Kakunenryo Kaihatsu Jigyodan, Tokyo, Japan

[21] Appl. No.: 746,818

[22] Filed: Aug. 15, 1991

Related U.S. Application Data

[63] Continuation of Ser. No. 411,147, Sep. 22, 1989, abandoned.

[30] Foreign Application Priority Data

Sep. 26, 1988 [JP] Japan .............................. 63-240069

[51] Int. Cl.$^5$ .............................................. G21F 9/16
[52] U.S. Cl. ...................................... 252/628; 252/630; 376/310; 264/0.5; 976/DIG. 377; 976/DIG. 378; 976/DIG. 395
[58] Field of Search ............... 252/626, 628, 633, 630; 423/19, 240 R, 241, 491, 493, 499; 264/0.5; 376/169, 310; 976/DIG. 378, DIG. 377, DIG. 395

[56] References Cited

U.S. PATENT DOCUMENTS

| | | | |
|---|---|---|---|
| 2,828,184 | 3/1958 | Behrman | 423/499 |
| 3,205,588 | 9/1965 | Oetjen et al. | 252/632 |
| 3,281,371 | 10/1966 | Nerge et al. | 252/632 |
| 3,681,495 | 8/1972 | Hussain | 424/211 |
| 3,726,937 | 4/1973 | Stepanov et al. | 423/499 |
| 3,992,510 | 11/1976 | Ishigami et al. | 423/500 |
| 4,017,147 | 4/1977 | Clark et al. | 252/628 |
| 4,229,317 | 10/1980 | Babad et al. | 562/54 |
| 4,284,472 | 8/1981 | Pomares et al. | 176/16 |
| 4,349,453 | 9/1982 | Brugere et al. | 252/627 |
| 4,931,263 | 6/1990 | Wakui et al. | 423/215.5 |

FOREIGN PATENT DOCUMENTS

| | | |
|---|---|---|
| 62-71899 | 4/1987 | Japan . |
| 2071899 | 4/1987 | Japan . |
| 1224257 | 4/1986 | U.S.S.R. . |

*Primary Examiner*—Donald P. Walsh
*Assistant Examiner*—Ngoclan T. Mai
*Attorney, Agent, or Firm*—Armstrong, Westerman, Hattori, McLeland & Naughton

[57] ABSTRACT

The invention provides a method of recovering and storing radioactive iodine by a freeze vacuum drying process, in which off-gas generated when spent fuel is subjected to shearing and dissolving treatments is scrubbed and, when necessary, is subjected to a precipitation treatment by addition of additives, after which waste liquid containing radioactive iodine is freeze-dried by a freeze vacuum drying process to recover radioactive iodine as iodine compounds. As a result, since the radioactive iodine does not vaporize, release of the radioactive iodine into the environment can be eliminated. In addition, consumption of a collecting agent such as silver zeolite for collecting vaporized radioactive iodine can be reduced. The iodine compounds containing the recovered radioactive iodine is given the same composition as a stable, naturally occurring mineral and is solidified and mineralized as by a high-pressure press. This makes it possible to store long half-life $^{129}$I radioactive iodine safely for an extended period by sealing recovered radioactive iodine in stable minerals for a long period of time.

4 Claims, 1 Drawing Sheet

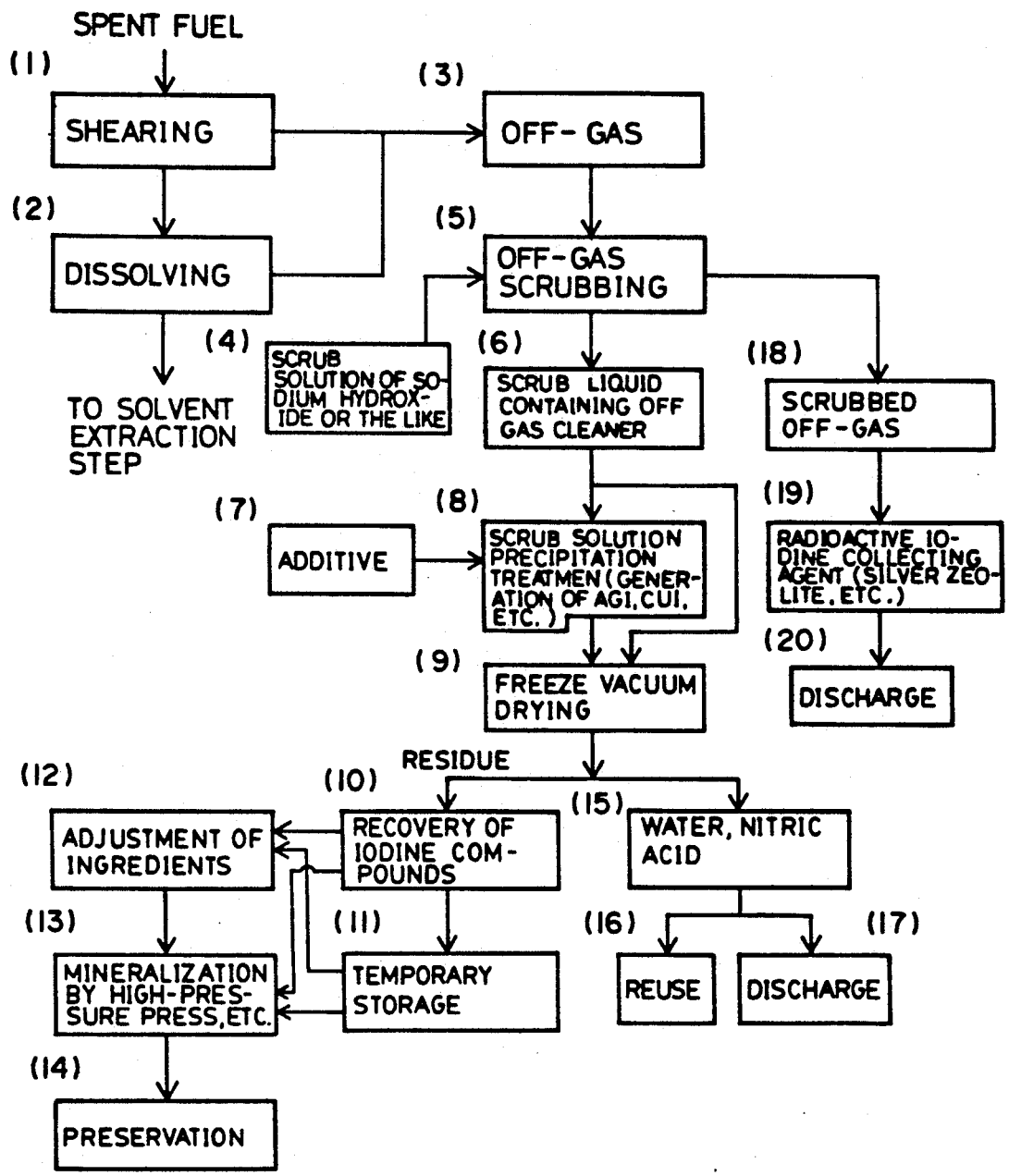

METHOD OF RECOVERING AND STORING RADIOACTIVE IODINE BY FREEZE VACUUM DRYING PROCESS

This application is a continuation of application Ser. No. 411,147 filed Sep. 22, 1989, now abandoned.

BACKGROUND OF THE INVENTION

This invention relates to a method, used in a spent nuclear fuel retreatment process, of rendering mineral an iodine compound containing recovered radioactive iodine and storing it, the radioactive iodine being recovered as an iodine compound without causing release of long half-life $^{129}I$ radioactive iodine into the environment, and disposing of scrub liquids from which radioactive iodine has been collected through freeze vacuum drying.

In a spent nuclear fuel retreatment process, elimination of radioactive iodine generated in the process of dissolving and shearing spent fuel is particularly vital due to a high iodine toxicity, a high iodine content of fission products, and a high rate of nuclear fission realized in the mass index of the two primary types of radioactive iodines, 1% $^{129}I$ at a long $(1.7 \times 10^7$ years) half-life and 2.09% $^{131}I$, a brief (eight day) half-life. When the iodine in the liquids supplied to solvent extraction remains to react with the solvent, it produces a chemical compound resistant to removal with a resultant contamination throughout the entire treatment process and makes important the removal of as much iodine as is practicable before it comes into contact with the solvent.

In the off-gas phase, aqueous phase or organic phase, iodine appears in $I_2$, HI or HIO or organic forms and appears as $HIO_3$ in dense nitrate solutions.

Conventional methods of removing iodine are removal by immersion in alkaline solutions such as $Na_2CO_3$ or NaOH or removal also through use of silver zeolite loaded with silver in a zeolite catalyst.

In methods employing alkaline solutions, however, removal of organic iodine is impossible and there is furthermore no way to recover iodine and treat it while maintaining it in solution. Radioactive iodine incapable of maintenance is released into the atmosphere and the accumulation of $^{129}I$ particularly with its long half life becomes a problem. In recovering radioactive iodine it is further necessary to utilize such valuable absorbents as silver zeolite. For this purpose a process making possible the suspension of radioactive iodine in a liquid is desirable. As it is vital to store long half-life $^{129}I$ over long periods, a process making possible safe storage of radioactive materials such as recovered $^{129}I$ is desired. In addition, liquid waste containing radioactive iodines generated in the retreatment process does not cause vaporization of radioactive iodines, so it is necessary to control the alkalinity. However, if this liquid waste becomes mixed with acidic liquid wastes, there is the danger that radioactive iodine may be irretrievably released. For this reason, there is need of a process in which liquid containing radioactive iodines may be treated individually without becoming mixed in with liquid wastes from another process.

SUMMARY OF THE INVENTION

An object of the present invention is to do away with the release of long-half life $^{129}I$ radioactive iodine into the environment through concentrating liquids containing radioactive iodine by a freeze vacuum drying process and recovering the iodine as iodine compounds.

Another object of the present invention is the long term stable storage of radioactive iodine by rendering iodine compounds containing recovered radioactive iodine mineral.

Yet another object of the present invention is to treat radioactive iodine while maintaining it in solution and reduce the consumption of an iodine collecting agent such as silver zeolite.

Still another object of the present invention is to avoid the mistaken release of radioactive iodines by separate processing solely of liquids containing radioactive iodine without allowing mixing with waste liquids from other processes.

Lastly, a final object of the present invention is to avoid vaporization of radioactive iodine from liquids by adding silver and copper ions to liquids containing radioactive iodine, causing the precipitation of radioactive iodine compounds and additives and separating the radioactive iodine from solution.

In order to attain these objects, the present invention is characterized in that, in a spent fuel retreatment process, a generated off-gas is scrubbed, after which the cleaned scrub solution is precipitated alone or with the addition of an additive, followed by freeze drying the radioactive iodine-containing waste solution by a freeze vacuum drying process and recovering the radioactive iodine as an iodine compound. Scrubbing of the off-gas is carried out by using sodium hydroxide solution, and copper and silver ions are added as the additive in the precipitation process. Further, the invention is characterized by solidifying and mineralizing, by a high-pressure press or the like, the iodine compound containing the recovered radioactive iodine directly or after adjusting the compound into a composition of a naturally occurring iodine-containing mineral.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The sole FIGURE is for describing the process flow of radioactive iodine recovery by the freeze vacuum drying process as well as the method of storage.

DESCRIPTION OF THE PREFERRED EMBODIMENT

An embodiment of the invention will now be described with reference to the FIGURE.

The FIGURE is a view showing an example of the flow in a case where the iodine recovery and storage method of the invention is applied to retreatment processing of spent nuclear fuel. In the FIGURE, (1) is a shearing step, (2) a dissolving step, (3) off-gas, (4) a scrub solution such as a sodium hydroxide solution, (5) steps in the process of scrubbing the off-gas, (6) scrub solution after completion of off-gas scrubbing, (7) additives, (8) a precipitation step, (9) a freeze vacuum drying step, (10) an iodine compound recovery step, (11) a storage step, (12) an ingredient preparation step, (13) a mineralizing step, (14) a preservation step, (15) a water and nitric acid treatment step, (16) a reutilization step, (17) a discharge step, (18) scrubbed off-gas, (19) a radioactivity capture step, and (20) a discharge step.

In the FIGURE, spend fuel is sheared at step (1) at a retreatment facility. Off-gas containing the radioactive iodines $^{129}$I of long half-life and $^{131}$I of short half-life produced at the dissolving step (2) is scrubbed at the off-gas scrubbing step (5) by the scrub solution (4) such as sodium hydroxide and recovered in cleaned off-gas scrub solution (6) through generation of radioactive iodines NaI, NaIO$_3$. Meanwhile cleaned off-gas (18) containing unrecovered radioactive iodines in scrub solution (6) is released into the environment at the discharge step (20) after removal of iodines at step (19) through a radioactive iodine capturing substance such as silver zeolite.

The solution in the dissolving step (2) is treated in a solvent extraction process.

Clean off-gas scrub solution (6) containing radioactive iodines is put through the scrub solution precipitating step (8) by adding copper and silver additives (7) as necessary, and radioactive iodines are separated from the solution by the formation of such precipitates as copper iodide or silver iodide. It should be noted that this treatment can be omitted since the compound of Na and iodine will undergo almost no decomposition by a low-temperature treatment below.

Next, when either cleaned scrub solution (6) containing radioactive iodine or liquids containing precipitate remaining after settling of the scrub solution is treated by freeze drying at the freeze vacuum drying step (9), water and nitrates sublime and are separated, and radioactive iodine (10) is recovered as iodine compounds (NaI, NaIO$_3$, CuI, AgI, etc.) in the form of residue. Under these conditions, freezing is eliminated, but no vaporization takes place since recovery is achieved in the form of iodine compounds. When necessary, the recovered iodine compounds containing radioactive iodine either directly or after being temporarily stored at the storage step (11) are made to have the same composition by adding suitable compounds to, e.g., natural, stable iodine-containing minerals (Chile saltpeter, Dictzeit, Jodyrite, Mitertite, etc.). After adjustment of ingredients at step (12), or without such adjustment, mineralization is performed by a high-pressure press or the like at the mineralization step (13), and the results are preserved as a mineral at step (14). Storage is thus possible in a stable mineral state.

Meanwhile, sublimation is carried out at the freeze vacuum drying step (9), and water and nitric acid trapped and recovered at the water and nitric acid treatment step (15) containing almost no radioactive iodine are either utilized again at step (16) or released at step (17).

The following advantages are achieved according to the present invention:

(i) When processing liquids containing radioactive iodines by a freeze vacuum drying process, the radioactive iodines are not vaporized. Therefore, it is possible to eliminate release of $^{129}$I radioactive iodine into the environment. Owing to its long half-life, such release of radioactive iodine into the environment would cause problems.

(ii) When treating liquids containing radioactive iodines by freeze vacuum drying, radioactive iodine is not vaporized. This makes it possible to reduce the consumption of collecting agents such as silver zeolite that are used to collect vaporized radioactive iodine.

(iii) By treating liquids containing radioactive iodines individually without allowing mixing with waste liquids that do not radioactive iodine generated at a retreatment process, it is possible to maintain alkalinity at all times so there is not chance of causing vaporization of radioactive iodine by mistake.

(iv) It is possible to store long half-life $^{129}$I radioactive iodine safely for an extended period by sealing recovered radioactive iodine in stable minerals for a long period of time.

(v) It is possible to prevent vaporization of radioactive iodine and recover the same by adding silver ions, copper ions or the like to the liquid containing the radioactive iodine, causing precipitation of the compounds of additive and radioactive iodine and separating the radioative iodine from solution.

As many apparently widely different embodiments of the present invention can be made without departing from the spirit and scope thereof, it is to be understood that the invention is not limited to the specific embodiments thereof except as defined in the appended claims.

What is claimed is:

1. A method for recovering radioactive iodine from an off-gas generated when spend nuclear fuel is being reprocessed, which comprises passing the off-gas through a scrubbing solution capable of dissolving the radioactive iodine to separate the radioactive iodine from the off-gas, adding a compound to the scrubbing solution which forms a precipitate with the radioactive iodine dissolved in the scrubbing solution, and freeze drying the scrubbing solution containing the precipitated radioactive iodine.

2. A method according to claim 1 wherein the scrubbing solution contains sodium hydroxide.

3. A method according to claim 2, wherein the compound contains cooper ion or silver ion.

4. A method according to claim 1, wherein the product obtained on freeze drying is mixed with a naturally occurring iodine-containing compound and the mixture is mineralized by the application of high pressure in a high pressure press.

* * * * *